US012533785B2

(12) United States Patent
Craig et al.

(10) Patent No.: US 12,533,785 B2
(45) Date of Patent: Jan. 27, 2026

(54) POWER TOOL WITH INTEGRATED GEAR CASE

(71) Applicant: MILWAUKEE ELECTRIC TOOL CORPORATION, Brookfield, WI (US)

(72) Inventors: Kentez L. Craig, Milwaukee, WI (US); Amith J. Baskaran, Menomonee Falls, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 0 days.

(21) Appl. No.: 18/516,557

(22) Filed: Nov. 21, 2023

(65) Prior Publication Data

US 2024/0165783 A1 May 23, 2024

Related U.S. Application Data

(60) Provisional application No. 63/384,519, filed on Nov. 21, 2022, provisional application No. 63/384,522, filed on Nov. 21, 2022.

(51) Int. Cl.
*B25D 17/06* (2006.01)
*B25F 5/02* (2006.01)

(52) U.S. Cl.
CPC ................ *B25D 17/06* (2013.01); *B25F 5/02* (2013.01)

(58) Field of Classification Search
CPC ......... B25B 21/02; B25B 21/026; B25F 5/02; B25D 17/06
See application file for complete search history.

(56) References Cited

U.S. PATENT DOCUMENTS

| | | | |
|---|---|---|---|
| 3,166,168 | A | 1/1965 | Hanns |
| 3,369,615 | A | 2/1968 | Maffey, Jr. et al. |
| 6,446,734 | B1 | 9/2002 | Williams et al. |
| 6,805,207 | B2 | 10/2004 | Hagan et al. |

(Continued)

FOREIGN PATENT DOCUMENTS

| | | | |
|---|---|---|---|
| CN | 205343015 | U | 6/2016 |
| CN | 205438463 | U | 8/2016 |

(Continued)

OTHER PUBLICATIONS

Extended European Search Report for Application No. 23210763.1 dated Jul. 10, 2024 (10 pages).

*Primary Examiner* — Himchan Song
(74) *Attorney, Agent, or Firm* — Michael Best & Friedrich LLP

(57) ABSTRACT

A power tool may include a housing including first and second clamshell halves. The power tool may include a motor directly supported by the first and second clamshell halves. The power tool may include a gear assembly directly supported by the first and second clamshell halves and operably coupled to the motor. The power tool may include an impact mechanism disposed within the housing between the first and second clamshell halves and operably coupled to the gear assembly, the impact mechanism including a camshaft, an anvil rotationally supported by an anvil support for rotation about an axis, the anvil support being directly supported by the first and second clamshell halves, and a hammer configured to reciprocate along the camshaft and to impart rotational impacts to the anvil in response to rotation of the camshaft.

20 Claims, 5 Drawing Sheets

(56) References Cited

U.S. PATENT DOCUMENTS

| | | | |
|---|---|---|---|
| 7,090,032 B2 | 8/2006 | Wada et al. | |
| 7,395,876 B1 | 7/2008 | Walker | |
| 7,845,427 B2 | 12/2010 | Wan et al. | |
| 7,980,324 B2 | 7/2011 | Bixler et al. | |
| 8,037,948 B2 | 10/2011 | Albinsson et al. | |
| 8,205,684 B2 | 6/2012 | Kokinelis et al. | |
| 8,205,685 B2 | 6/2012 | Bixler et al. | |
| 8,210,277 B2 | 7/2012 | Umeda et al. | |
| 8,714,279 B2 | 5/2014 | Nagasaka et al. | |
| 8,757,286 B2 | 6/2014 | Nagasaka et al. | |
| 9,221,156 B2 | 12/2015 | Bachman et al. | |
| 9,450,472 B2 | 9/2016 | Hatfield et al. | |
| 9,505,118 B2 | 11/2016 | Furusawa et al. | |
| 9,545,713 B2 | 1/2017 | Johnson et al. | |
| 9,579,785 B2 | 2/2017 | Bixler et al. | |
| 9,643,300 B2 | 5/2017 | Kumagai et al. | |
| 9,878,435 B2 | 1/2018 | Ito | |
| 9,950,419 B2 | 4/2018 | Rompel et al. | |
| 10,040,178 B2 | 8/2018 | Kondo et al. | |
| 10,213,907 B2 | 2/2019 | Kumagai et al. | |
| 10,478,950 B2 | 11/2019 | Nagasaka et al. | |
| 10,486,296 B2 | 11/2019 | Ito | |
| 10,668,614 B2 | 6/2020 | Bartoszek et al. | |
| 10,906,163 B2 | 2/2021 | Nagasaka et al. | |
| 10,971,966 B2 | 4/2021 | Kuehne et al. | |
| 10,987,793 B2 | 4/2021 | Bixler et al. | |
| 11,045,926 B2 | 6/2021 | Kumagai et al. | |
| 11,084,158 B2 | 8/2021 | Machida et al. | |
| 11,192,223 B2 | 12/2021 | Kumagai et al. | |
| 11,260,515 B2 | 3/2022 | Ito | |
| 11,305,406 B2 | 4/2022 | Araki et al. | |
| 2005/0022358 A1 | 2/2005 | Hagan et al. | |
| 2005/0028997 A1 | 2/2005 | Hagan et al. | |
| 2005/0061524 A1 | 3/2005 | Hagan et al. | |
| 2005/0155778 A1 | 7/2005 | Ishida et al. | |
| 2008/0271906 A1 | 11/2008 | Walker | |
| 2009/0114412 A1 | 5/2009 | Hatfield | |
| 2009/0258584 A1 | 10/2009 | Huber et al. | |
| 2012/0222879 A1 | 9/2012 | Bixler et al. | |
| 2014/0091648 A1 | 4/2014 | Kumagai | |
| 2017/0203418 A1 | 7/2017 | Kumagai et al. | |
| 2017/0326720 A1* | 11/2017 | Kuroyanagi | B25F 5/021 |
| 2018/0222022 A1* | 8/2018 | Kumagai | B25D 11/104 |
| 2019/0262978 A1* | 8/2019 | Tejima | B25B 21/026 |
| 2019/0291259 A1 | 9/2019 | Herr et al. | |
| 2019/0358789 A1* | 11/2019 | Chung | B25B 21/026 |
| 2020/0047322 A1 | 2/2020 | Ito | |
| 2020/0189086 A1 | 6/2020 | Liang et al. | |
| 2020/0282540 A1 | 9/2020 | Bartoszek et al. | |
| 2021/0016428 A1 | 1/2021 | Nakashima | |
| 2021/0107131 A1 | 4/2021 | Kuehne et al. | |
| 2021/0162571 A1* | 6/2021 | Kondo | B25B 21/026 |
| 2021/0194312 A1 | 6/2021 | Kuehne et al. | |
| 2021/0276164 A1 | 9/2021 | Kumagai et al. | |
| 2021/0331304 A1 | 10/2021 | Machida et al. | |
| 2022/0024018 A1 | 1/2022 | Benzing | |
| 2022/0055191 A1 | 2/2022 | Kumagai et al. | |
| 2022/0069662 A1 | 3/2022 | Cyborski | |
| 2022/0118589 A1 | 4/2022 | Takahagi | |
| 2022/0134527 A1 | 5/2022 | Ito | |
| 2022/0203512 A1* | 6/2022 | Kondo | H02K 9/06 |
| 2022/0212320 A1* | 7/2022 | Kawai | B25B 21/02 |
| 2022/0286024 A1* | 9/2022 | Nakatsuka | H02K 7/003 |
| 2023/0043704 A1* | 2/2023 | Kondo | B25B 21/02 |
| 2023/0158657 A1* | 5/2023 | Eba | B25F 5/02 173/178 |
| 2023/0182271 A1* | 6/2023 | Zhao | B25B 21/026 173/93 |

FOREIGN PATENT DOCUMENTS

| | | |
|---|---|---|
| CN | 208867076 U | 5/2019 |
| CN | 212071751 U | 12/2020 |
| CN | 213411817 U | 6/2021 |
| CN | 114670158 A | 6/2022 |
| CN | 115122281 A | 9/2022 |
| DE | 102020104295 A1 | 8/2020 |
| DE | 102020129856 A1 | 6/2021 |
| EP | 0570889 A | 11/1993 |
| EP | 0794038 A2 | 9/1997 |
| EP | 1787762 A1 | 5/2007 |
| EP | 1787765 A2 | 5/2007 |
| EP | 2813325 A2 | 12/2014 |
| EP | 3316453 A1 | 5/2018 |
| EP | 3481590 | 5/2019 |
| WO | 2010114055 A1 | 10/2010 |
| WO | 2017110229 A1 | 6/2017 |
| WO | 2018011206 A1 | 1/2018 |
| WO | 2022004330 A1 | 1/2022 |

* cited by examiner

POWER TOOL WITH INTEGRATED GEAR CASE

CROSS-REFERENCE TO RELATED APPLICATIONS

This application claims priority to U.S. Provisional Patent Application No. 63/384,519, filed on Nov. 21, 2022, and U.S. Provisional Patent Application No. 63/384,522, filed on Nov. 21, 2022, the entire contents of each of which are incorporated herein by reference.

FIELD

The present disclosure relates to power tools, and to power tools having a case enclosing a gear assembly, impact assembly, or the like.

BACKGROUND

Power tools with gear assemblies, impact assemblies, and the like typically include a gear case, which may also be referred to as an impact case or front housing, to enclose and support such assemblies. The gear case is typically a separate component coupled to a main housing (e.g., clamshell housing) of the power tool.

SUMMARY

In some aspects, the techniques described herein relate to a power tool including: a housing including first and second clamshell halves; a motor directly supported by the first and second clamshell halves; a gear assembly directly supported by the first and second clamshell halves and operably coupled to the motor; and an impact mechanism disposed within the housing between the first and second clamshell halves and operably coupled to the gear assembly, the impact mechanism including a camshaft, an anvil rotationally supported by an anvil support for rotation about an axis, the anvil support being directly supported by the first and second clamshell halves, and a hammer configured to reciprocate along the camshaft and to impart rotational impacts to the anvil in response to rotation of the camshaft.

In some aspects, the techniques described herein relate to a power tool, wherein a seam defined between the first and second clamshell halves extends along a front face of the housing.

In some aspects, the techniques described herein relate to a power tool, wherein the anvil extends through the front face of the housing.

In some aspects, the techniques described herein relate to a power tool, wherein the anvil support includes a bearing or a bushing disposed in a recess of the housing.

In some aspects, the techniques described herein related to a power tool, wherein the anvil support is an integral portion of the housing.

In some aspects, the techniques described herein relate to a power tool, wherein the housing includes a sealed chamber enclosing the gear assembly and the impact mechanism.

In some aspects, the techniques described herein relate to a power tool, wherein the sealed chamber is sealed by sealing elements disposed in the housing.

In some aspects, the techniques described herein relate to a power tool, wherein the sealed chamber is bounded by a wall positioned between the motor and the gear assembly.

In some aspects, the techniques described herein relate to a power tool, wherein the gear assembly includes a pinion coupled to the motor, a plurality of planet gears meshed with the pinion and coupled to the camshaft, and a ring gear meshed with the plurality of planet gears and directly supported by the first and second clamshell halves.

In some aspects, the techniques described herein relate to a power tool, wherein the housing further includes an end cap coupled to the first and second clamshell halves.

In some aspects, the techniques described herein relate to a power tool, wherein the first and second clamshell halves and a body of the end cap are made of a polymer material.

In some aspects, the techniques described herein relate to a power tool, wherein the end cap includes an insert made of a material different than the polymer material.

In some aspects, the techniques described herein relate to a power tool including: a housing including first and second clamshell halves; a motor directly supported by the first and second clamshell halves; and an output member extending from the housing, the output member configured to be driven by the motor to drive a tool bit, wherein the output member is rotationally supported by an output member support for rotation about an axis, and wherein the output member support is directly supported by the first and second clamshell halves.

In some aspects, the techniques described herein relate to a power tool, wherein the motor includes a stator and a rotor, the rotor includes a fan, the rotor is rotationally supported by a rotor bearing having an inner race and an outer race, the housing includes an end cap coupled to the first and second clamshell halves, the end cap includes a post supporting the inner race of the rotor bearing, and the outer race of the rotor bearing is received within the fan.

In some aspects, the techniques described herein relate to a power tool including: a housing including first and second clamshell halves and an end cap coupled to the first and second clamshell halves, the end cap including a post; a motor including a stator supported by the first and second clamshell halves and a rotor rotationally supported by a rotor bearing; and an output member extending from the housing, the output member configured to be driven by the motor to drive a tool bit, wherein the post of the end cap supports an inner race of the rotor bearing.

In some aspects, the techniques described herein relate to a power tool, wherein the rotor includes a fan, and wherein the rotor bearing includes an outer race received within the fan.

In some aspects, the techniques described herein relate to a power tool, wherein a rear surface of the rotor bearing is flush with a rear surface of the fan.

In some aspects, the techniques described herein relate to a power tool, wherein the end cap includes a body and an insert molded within the end cap, and wherein the insert includes the post.

In some aspects, the techniques described herein relate to a power tool, wherein the body of the end cap is made of a polymer material, and wherein the insert is made of a material different than the polymer material.

In some aspects, the techniques described herein relate to a power tool, wherein the first and second clamshell halves are made of the polymer material.

In some aspects, the techniques described herein relate to a power tool, wherein the post is integrally formed as a single piece with a remainder of the end cap.

Other features and aspects of the disclosure will become apparent by consideration of the following detailed description and accompanying drawings.

DETAILED DESCRIPTION

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting.

Figure 1:
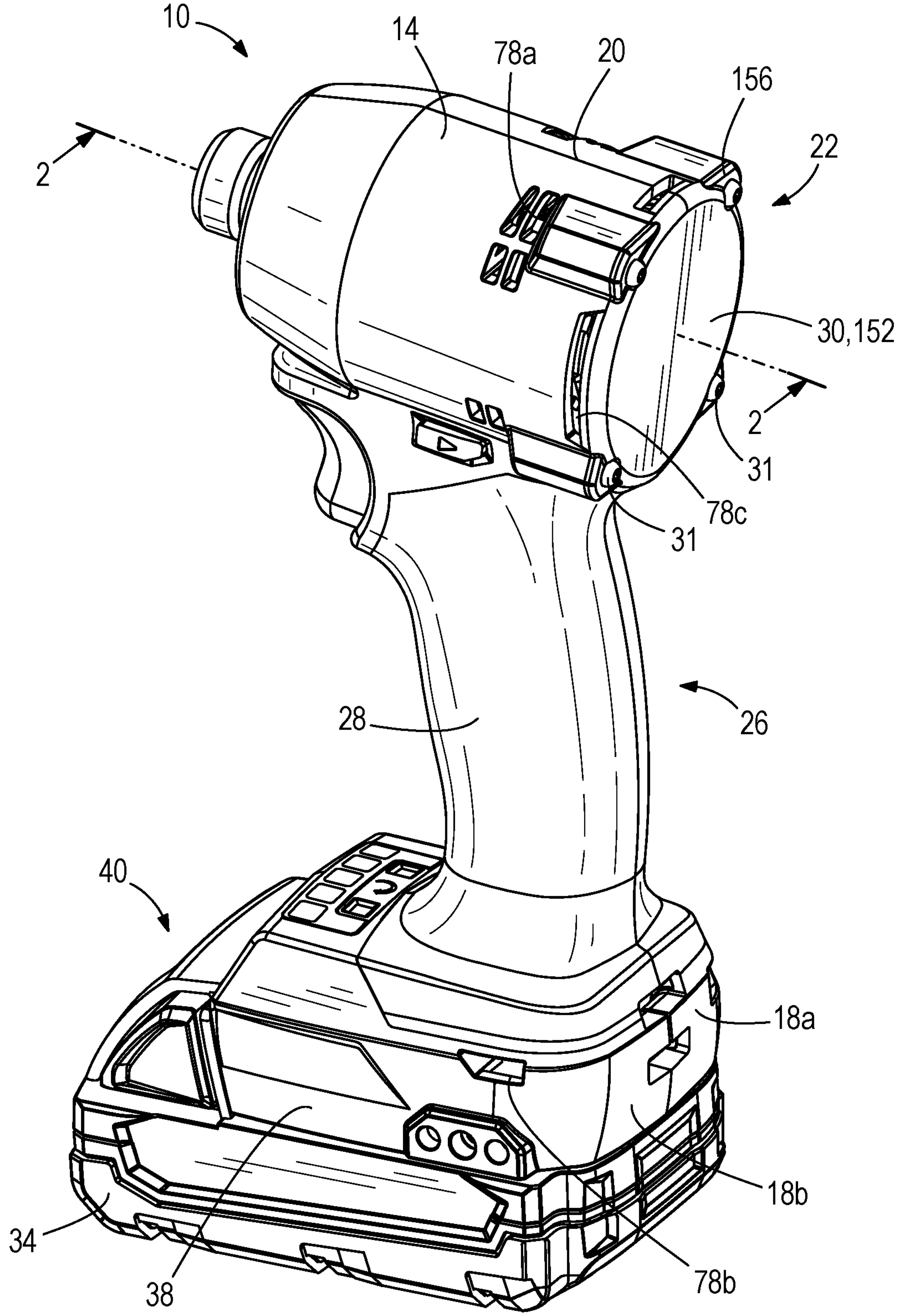
FIG. 1 is a perspective view of a power tool according to an embodiment of the present disclosure.
Figure 2:
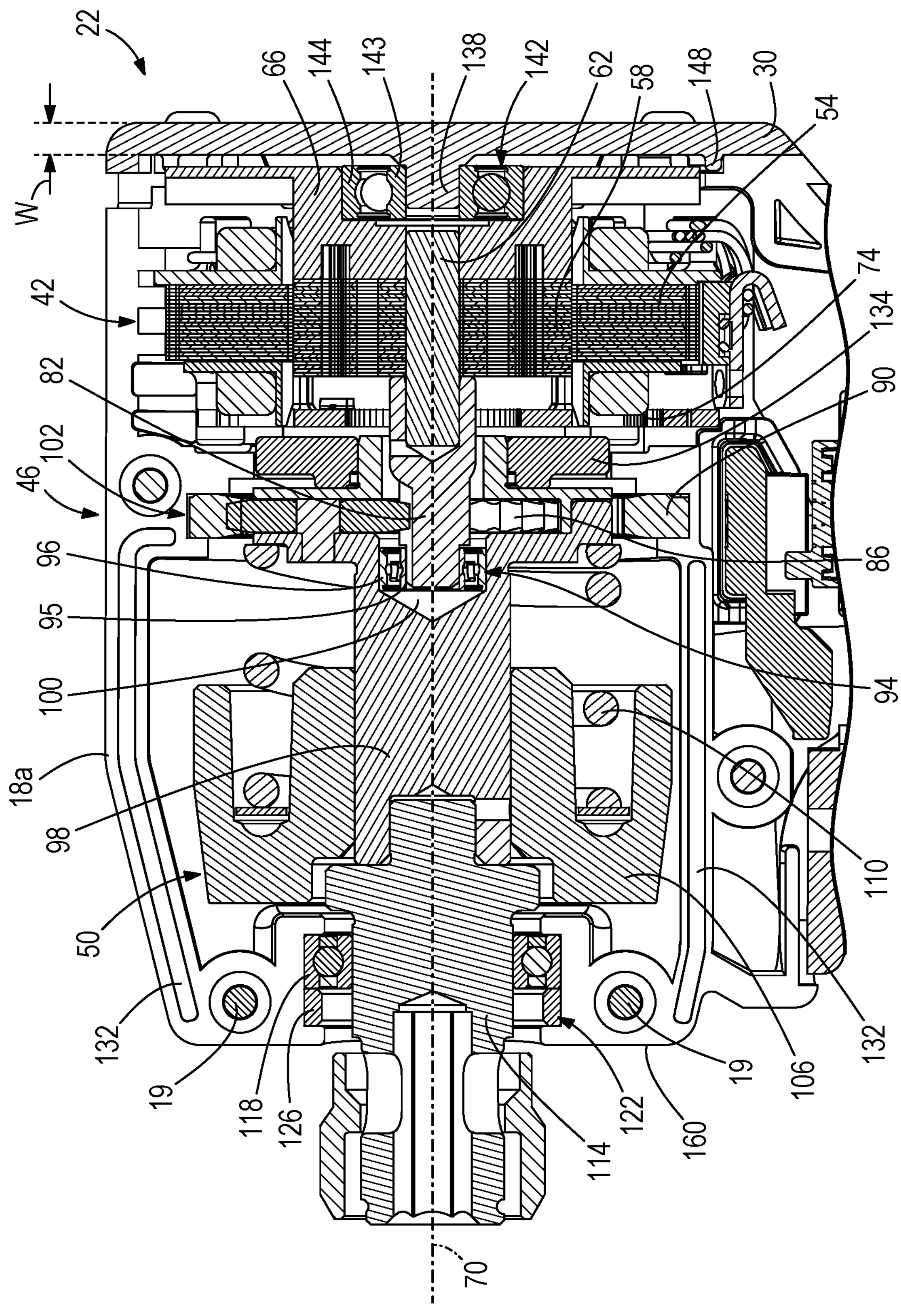
FIG. 2 is a cross-sectional view of a portion of the power tool of FIG. 1, taken along line 2-2 in FIG. 1.

FIG. 1 illustrates an embodiment of a power tool 10 in the form of a rotary impact tool, and, more specifically, an impact driver. The power tool 10 includes a housing 14 defined by cooperating first and second clamshell halves 18*a*, 18*b* (which may also be referred to as first and second housing portions). The illustrates first and second clamshell halves 18*a*, 18*b* are coupled together by a first plurality of fasteners 19 at a parting plane or seam 20 (FIG. 2). In the illustrated embodiment, the seam 20 is positioned along a longitudinal center plane of the power tool 10. The housing 14 includes a head housing portion 22 and a handle portion 26 extending downwardly from the head housing portion 22. In the illustrated embodiment, the handle portion 26 is covered or surrounded by a grip portion 28. The illustrated head housing portion 22 further includes an end cap 30 coupled to a rear portion of the first and second clamshell halves 18*a*, 18*b* (e.g., by a second plurality of fasteners 31). In the illustrated embodiment, the end cap 30 spans across both of the clamshell halves 18*a*, 18*b*. In other embodiments, the end cap 30 may be integrally formed with the first and second clamshell halves 18*a*, 18*b*, such that the head housing portion 22 is defined entirely by the clamshell halves 18*a*, 18*b*. The power tool 10 further includes a battery 34 removably coupled to a battery receptacle 38 located at a bottom end or foot 40 of the handle portion 26.

With reference to FIG. 2, a motor 42 (e.g., a brushless DC electric motor), a gear assembly 46, and an impact mechanism 50 are enclosed within the head housing portion 22. Stated another way, the motor 42, the gear assembly 46, and the impact mechanism 50 are enclosed within the clamshell halves 18*a*, 18*b* and the end cap 30. The motor 42 includes a stator 54 and a rotor 58. The stator 54 is directly supported by the clamshell halves 18*a*, 18*b*. The stator 54 may include, for example, a stator frame and a plurality of coils or windings. The rotor 58 includes a plurality of laminations and embedded permanent magnets, an output shaft 62, and a fan 66. The output shaft 62 and the fan 66 are coupled for co-rotation with the rotor 58 about an axis 70 relative to the stator 54. A sensor PCB 74, which includes a plurality of sensors (e.g., Hall-effect sensors) for detecting rotation of the rotor 58, is coupled to a front side of the frame of the stator 54. In other embodiments, the sensor PCB 74 may be coupled to a rear side of the frame of the stator 54.

With returned reference to FIG. 1, the housing 14 includes vents 78*a*, 78*b*, 78*c* to allow airflow through the housing 14. The airflow is configured to cool the motor 42 and/or other electronic components (e.g., PCBs, switching electronics, etc.) within the housing 14. In the illustrated embodiment, the housing 14 includes a first plurality of intake vents 78*a* formed in the head housing portion 22, a second plurality of intake vents 78*b* formed in the foot 40, and a plurality of exhaust vents 78*c* formed in the head housing portion 22 adjacent the end cap 30. During operation, rotation of the fan 66 may draw cooling air into the housing 14 through the intake vents 78*a*. 78*b* and then discharge the cooling air through the exhaust vents 78*c*.

With returned reference to FIG. 2, in the illustrated embodiment, the gear assembly 46 includes a pinion 82 coupled to the output shaft 62, a plurality of planet gears 86 meshed with the pinion 82, and a ring gear 90 meshed with the planet gears 86. In some embodiments, the pinion 82, planet gears 86, and the ring gear 90 may be spur gears, helical gears, or other suitable types of gears. The pinion 82 is rotatably supported by a front rotor bearing 94 (e.g., ball bearing). The front rotor bearing 94 is disposed within a cavity 100 in a camshaft 98 and includes an inner race 95 and an outer race 96. The inner race 95 is coupled to the pinion 82 and rotates with the pinion 82. The outer race 96 is coupled to the camshaft 98 and rotates with the camshaft 98. In some embodiments, the inner race 95 may include lugs that are received by recesses in the pinion 82 to further secure the inner race 95 to the pinion 82. In other embodiments, the pinion 82 may include lugs and the inner race 95 may include recesses to receive the lugs. The ring gear 90 is rotationally fixed within a recess 102 in the head housing portion 22. Stated another way, the ring gear 90 is directly supported by the clamshell halves 18*a*, 18*b*. In some embodiments, the ring gear 90 may include lugs that are received in additional recesses or grooves within the head housing portion 22 to further fix the ring gear 90 within the head housing portion 22.

With continued reference to FIG. 2, the planet gears 86 are coupled to the camshaft 98 of the impact mechanism 50 such that the camshaft 98 acts as a planet carrier. Accordingly, rotation of the output shaft 62 rotates the planet gears 86, which then advance along the inner circumference of the ring gear 90 and thereby rotate the camshaft 98. The impact mechanism 50 further includes a hammer 106 supported on and axially slidable relative to the camshaft 98, a spring 110 partially disposed within the hammer 106 and configured to bias the hammer 106 along the axis 70 toward a front side of the power tool 10, and an anvil 114 (which may also be referred to as an output member). The hammer 106 is configured to reciprocate axially along the camshaft 98 to impart rotational impacts to the anvil 114 in response to rotation of the camshaft 98. The anvil 114 is rotationally supported for rotation about the axis 70 by an output member support or anvil support, which in the illustrated embodiment includes a bearing 118 (also referred to as an anvil bearing 118). The anvil bearing 118 is held within a recess 122 defined by a front portion of the clamshell halves 18*a*, 18*b*. As such, the anvil bearing 118 is directly supported by the clamshell halves 18*a*, 18*b*. In the illustrated embodiment, a bushing 126 is received in the recess 122 adjacent a front side of the anvil bearing 118. The bushing 126, (also directly supported by the clamshell halves 18*a*, 18*b*), abuts the anvil bearing 118 to secure and resist movement of the anvil bearing 118 along the axis 70. In some embodiments, the anvil 114 may additionally or alternatively be rotationally supported by the bushing 126. In some embodiments, the anvil 114 may be rotationally supported by multiple bearings or multiple bushings. As such, the anvil support may include one or more bushings or bearings. In some embodiments, the anvil support may be insert-molded within the housing 14. In yet other embodiments, the anvil support may be an integral portion of the clamshell halves 18*a*, 18*b*. In such embodiments, the clamshell halves 18*a*, 18*b* may collectively define a bearing surface directly supported by the remainder of the clamshell halves 18*a*, 18*b* and configured to rotationally support the anvil 114.

With continued reference to FIG. 2, the head housing portion 22 defines a chamber that encloses the gear assembly 46 and the impact mechanism 50. The chamber is at least partially sealed by sealing elements 132 which are made of a flexible/semi-flexible material (e.g., rubber, neoprene, silicone, or the like). The sealing elements 132 may be disposed within corresponding grooves in each of the clamshell halves 18*a*, 18*b* and may optionally be insert-molded within the clamshell halves 18*a*, 18*b*. The sealing elements 132 inhibit grease, oil, or the like that may be used to lubricate the gear assembly 46 and the impact mechanism 50 from escaping from the chamber. In the illustrated embodiment, the chamber is bounded at its rear side by a dividing wall 134. The dividing wall 134 is arranged between the motor 42 and the gear assembly 46. In some embodiments, one or more additional sealing elements (e.g., gaskets, o-rings, etc.) may seal between the dividing wall 134 and the clamshell halves 18*a*, 18*b*.

With continued reference to FIG. 2, the end cap 30 includes a post 138 extending from a body of the end cap 30 toward the front side of the power tool 10 along the axis 70. In the illustrated embodiment, the post 138 is integrally formed as a single piece with the remainder of the end cap 30. The post 138 is received within a bearing 142 (also referred to as a rear rotor bearing 142). The rear rotor bearing 142 includes an inner race 143 and an outer race 144. The post 138 contacts the inner race 143. More specifically, the inner race 143 is fixedly coupled to the post 138, such that the inner race 143 may not rotate. The outer race 144 is received within and coupled to the fan 66. The rear rotor bearing 142 is configured to support the fan 66, and the outer race 144 rotates with the fan 66 during operation. The fan 66 supports the output shaft 62, which in turn supports the rotor 58. Thus, the rear rotor bearing 142 supports a rear end portion of a rotor assembly, the rotor assembly comprising the rotor 58, output shaft 62 and fan 66. Similar to the front rotor bearing 94, in some embodiments, the rear rotor bearing 142 may include lugs or apertures on the inner race 143 and/or the outer race 144 that engage with lugs or apertures on the respective surfaces contacted by the inner race 143 and the outer race 144. In the illustrated embodiment, a rear surface of the rear rotor bearing 142 is flush with a rear surface of the fan 66. Stated another way, the entire rear rotor bearing 142 is disposed within the fan 66. This provides for a more compact length of the power tool 10 along the axis 70. In other embodiments, however, the rear rotor bearing 142 may be only partially recessed within the fan 66.

A front side (or inner side) of the illustrated end cap 30 includes a support member 148 that contacts the clamshell halves 18*a*, 18*b* to further secure the end cap 30 to the clamshell halves 18*a*, 18*b* (FIG. 2). In some embodiments, the support member 148 is an annular ring. In other embodiments, the support member 148 may include a plurality of independent projections that contact the clamshell halves 18*a*, 18*b*.

With continued reference to FIG. 2, the body of the end cap 30 has a width W measured parallel to the axis 70. In some embodiments, the width W is about 3 mm or less. In some embodiments, the width W is between 2.5 mm and 3 mm. In other embodiments, the end cap 30 may have another width W. The relatively thin width of the end cap 30 in the illustrated embodiment allows for the power tool 10 to have a very compact length along the axis 70.

Figure 3:
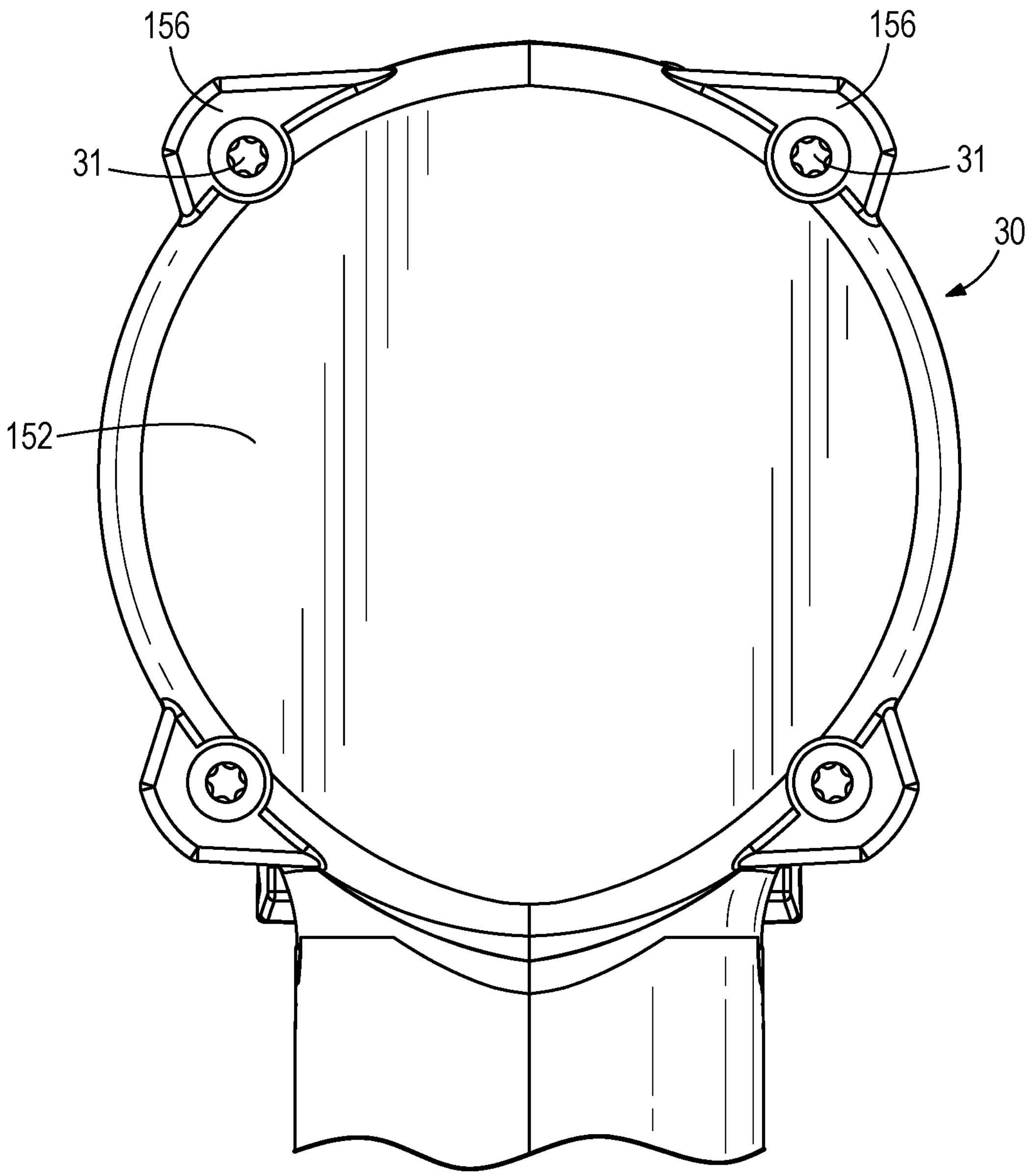
FIG. 3 is a rear view of a portion of the power tool of FIG. 1, illustrating an end cap of the power tool.

Best illustrated in FIG. 3, the end cap 30 includes a generally flat rear surface 152 on a side of the end cap 30 opposite the clamshell halves 18*a*, 18*b*. The rear surface 152 of the end cap 30 is generally circular in the illustrated embodiment. The end cap 30 further includes a plurality of cars 156 extending from the end cap 30 in a direction away from the axis 70. The cars 156 are shaped to provide support to the portion of the end cap 30 receiving the fasteners 31. In the illustrated embodiment, the cars 156 are offset from the rear surface 152, such that the cars 156 are not on a plane defined by the rear surface 152 (FIG. 1). In other words, the cars 156 are offset from the rear surface 152 in a direction along the axis 70 toward the front side of the power tool 10.

In the illustrated embodiment, the end cap 30 is made of the same material as the clamshell halves 18*a*, 18*b* (e.g., a polymer material, including but not limited to Nylon-66, ABS, a fiber-reinforced polymer material, or a glass-reinforced polymer material). In other embodiments, the end cap 30 may be made of a higher strength material (e.g., steel, carbon fiber reinforced nylon, etc.) than the remainder of the housing 14 to allow for sufficient strength to securely support the rear rotor bearing 142 while maintaining a thin width W.

Figure 4:
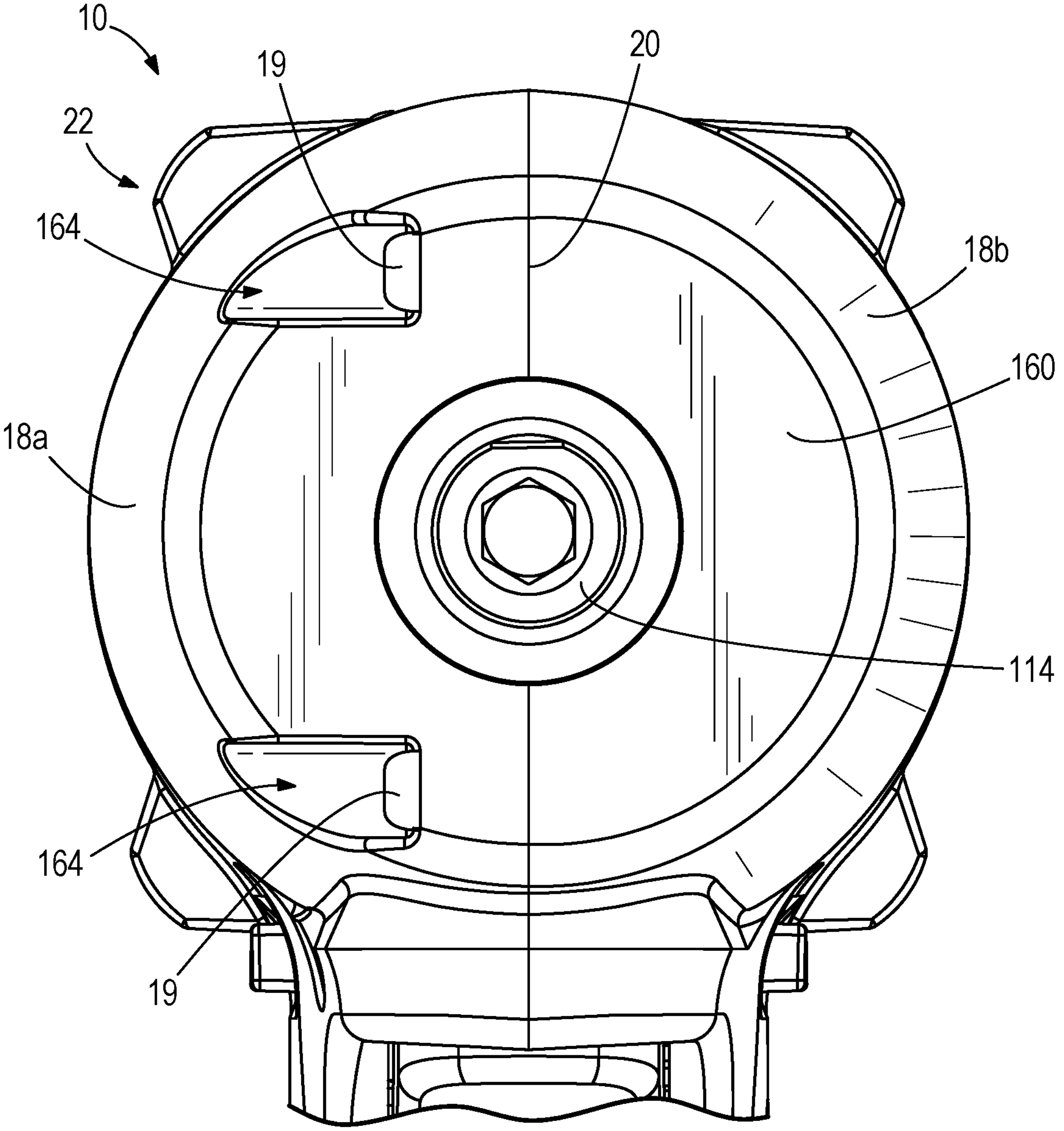
FIG. 4 is a front view of a portion of the power tool of FIG. 1.

As illustrated in FIG. 4, the seam 20 between the first clamshell half 18*a* and the second clamshell half 18*b* extends along a circular front face 160 of the head housing portion 22. Two of the plurality of fasteners 19 are disposed in cutouts 164 in the front face 160 and extend from the first clamshell half 18*a* to the second clamshell half 18*b*. The anvil 114 projects through the front face 160 (FIG. 2) and is configured to be attached to and/or drive a tool bit. The anvil 114 is illustrated as being concentric with the front face 160 and between the two of the plurality of fastener 19.

With reference to FIGS. 1, the illustrated clamshell halves 18*a*, 18*b* are independent components that are coupled together to form a majority of the external surface of the power tool 10. The clamshell halves 18*a*, 18*b* may be molded (e.g., blow molded, injection molded, etc.) out of a polymer material. In some embodiments, the clamshell halves 18*a*, 18*b* and the end cap 30 define the head housing portion 22. In other embodiments without an end cap, the clamshell halves 18*a*, 18*b* can define the head housing portion 22. The clamshell halves 18*a*, 18*b* provide sufficient rigidity and support for the operation of the motor 42, the gear assembly 46, and impact mechanism 50, which prevents the need for an additional gear case or front housing portion. The lack of a separate gear case allows the power tool 10 to be more compact and lightweight than power tools having a separate gear case. Gear cases are often made with metal, which is relatively heavy compared to the polymer material of the clamshell halves 18*a*, 18*b*. The lack of the gear case also decreases the total number of parts needed for the power tool 10 and may simplify manufacturing.

Figure 5:
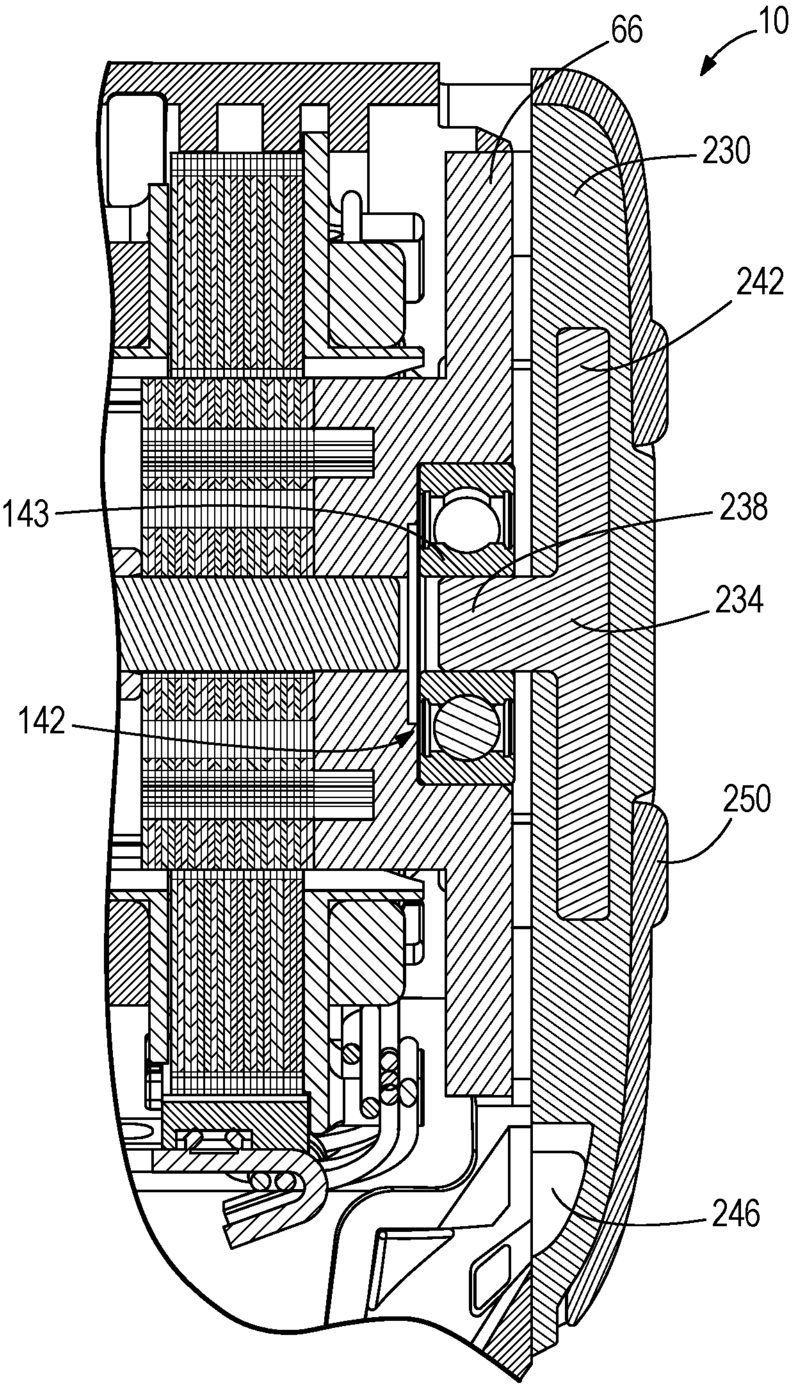
FIG. 5 is a cross-sectional view of a portion of the power tool of FIG. 1, including an end cap according to another embodiment.

FIG. 5 illustrates another end cap 230 for use with the power tool 10. The illustrated end cap 230 includes an insert 234 molded (e.g., insert-molded) within a body of the end cap 230. In the illustrated embodiment, the insert 234 is made of a material different than the material of the end cap 230. For example, the insert 234 is made of a high-strength material (e.g., steel, carbon fiber tape, carbon fiber sheet, etc.) that is relatively stronger than the material of the body of the end cap 230. The illustrated insert 234 includes a post

238 extending from the end cap 230 toward the front side of the power tool 10 along the axis 70 and into the rear rotor bearing 142. The post 238 is coupled to the inner race 143, such that the post 238 supports the inner race 143. The inner race 143 may be press-fit to the post 238 or secured to the post 238 in any other suitable manner. The insert 234 also includes an insert support 242 extending radially from the post 238 within the end cap 230. The insert support 242 is configured to stabilize the insert 234 within the end cap 230. In some embodiments, the insert support 242 is a generally circular disc. In other embodiments, the insert support 242 may be a plurality of projections. In the illustrated embodiment, the rear surface of the rear rotor bearing 142 is flush with the rear surface of the fan 66. The end cap 230 may include one or more exhaust openings 246 for discharging cooling air moved by the fan 66. The end cap 230 may also include a grip portion 250.

Although the disclosure has been described in detail with reference to certain preferred embodiments, variations and modifications exist within the scope and spirit of one or more independent aspects of the disclosure as described. For example, power tool 10 is described and illustrated herein as an impact tool; however, in other embodiments, the integrated gear case may be incorporated into other types of power tools, including continuous torque tools such as drills, powered screwdrivers, and the like. In such embodiments, the anvil 114 may be replaced by a spindle or other output member driven by the motor.

Various features of the disclosure are set forth in the following claims.

What is claimed is:

1. A power tool comprising:
a housing including first and second clamshell halves;
a motor directly supported by the first and second clamshell halves;
a gear assembly directly supported by the first and second clamshell halves and operably coupled to the motor; and
an impact mechanism disposed within the housing between the first and second clamshell halves and operably coupled to the gear assembly, the impact mechanism including
a camshaft,
an anvil rotationally supported by an anvil support for rotation about an axis, the anvil support being directly supported by the first and second clamshell halves, and
a hammer configured to reciprocate along the camshaft and to impart rotational impacts to the anvil in response to rotation of the camshaft.

2. The power tool of claim 1, wherein a seam defined between the first and second clamshell halves extends along a front face of the housing.

3. The power tool of claim 2, wherein the anvil extends through the front face of the housing.

4. The power tool of claim 1, wherein the anvil support includes a bearing or a bushing disposed in a recess of the housing.

5. The power tool of claim 1, wherein the anvil support is an integral portion of the housing.

6. The power tool of claim 1, wherein the housing includes a sealed chamber enclosing the gear assembly and the impact mechanism, and wherein the sealed chamber is sealed by sealing elements disposed in the housing.

7. The power tool of claim 6, wherein the sealed chamber is bounded by a wall positioned between the motor and the gear assembly.

8. The power tool of claim 1, wherein the gear assembly includes
a pinion coupled to the motor,
a plurality of planet gears meshed with the pinion and coupled to the camshaft, and
a ring gear meshed with the plurality of planet gears and directly supported by the first and second clamshell halves.

9. The power tool of claim 1, wherein the housing further includes an end cap coupled to the first and second clamshell halves.

10. The power tool of claim 9, wherein the first and second clamshell halves and a body of the end cap are made of a polymer material.

11. The power tool of claim 10, wherein the end cap includes an insert made of a material different than the polymer material.

12. A power tool comprising:
a housing including first and second clamshell halves;
a motor directly supported by the first and second clamshell halves; and
an output member extending from the housing, the output member configured to be driven by the motor to drive a tool bit,
wherein the output member is rotationally supported by an output member support for rotation about an axis, and
wherein the output member support is directly supported by the first and second clamshell halves.

13. The power tool of claim 12, wherein
the motor includes a stator and a rotor,
the rotor includes a fan,
the rotor is rotationally supported by a rotor bearing having an inner race and an outer race,
the housing includes an end cap coupled to the first and second clamshell halves,
the end cap includes a post supporting the inner race of the rotor bearing, and
the outer race of the rotor bearing is received within the fan.

14. A power tool comprising:
a housing including first and second clamshell halves and an end cap coupled to the first and second clamshell halves, the end cap including a post;
a motor including a stator supported by the first and second clamshell halves and a rotor rotationally supported by a rotor bearing; and
an output member extending from the housing, the output member configured to be driven by the motor to drive a tool bit,
wherein the post of the end cap supports an inner race of the rotor bearing.

15. The power tool of claim 14, wherein the rotor includes a fan, and wherein the rotor bearing includes an outer race received within the fan.

16. The power tool of claim 15, wherein a rear surface of the rotor bearing is flush with a rear surface of the fan.

17. The power tool of claim 14, wherein the end cap includes a body and an insert molded within the end cap, and wherein the insert includes the post.

18. The power tool of claim 17, wherein the body of the end cap is made of a polymer material, and wherein the insert is made of a material different than the polymer material.

19. The power tool of claim 18, wherein the first and second clamshell halves are made of the polymer material.

20. The power tool of claim 14, wherein the post is integrally formed as a single piece with a remainder of the end cap.

* * * * *